No. 764,723. Patented July 12, 1904.

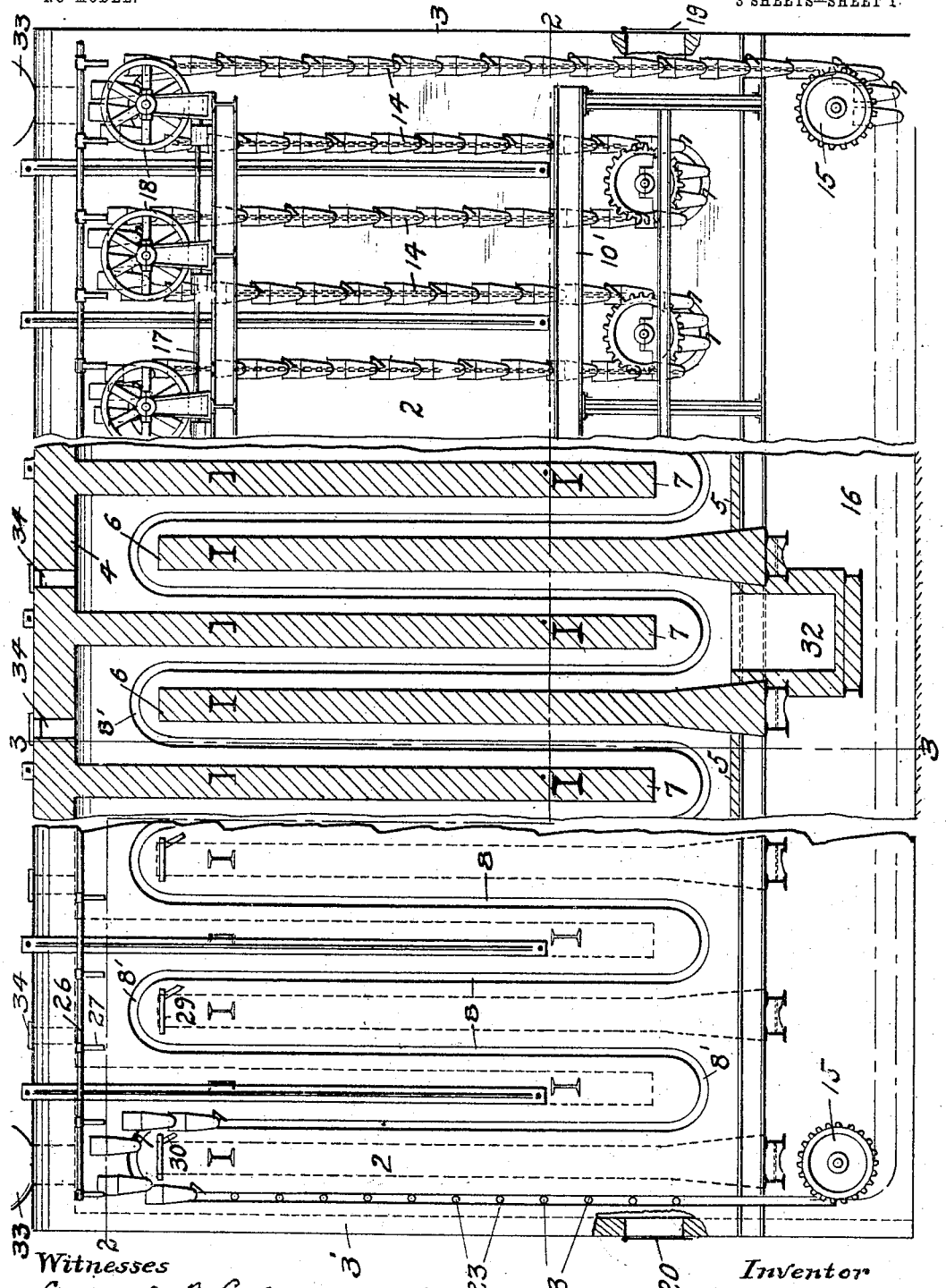

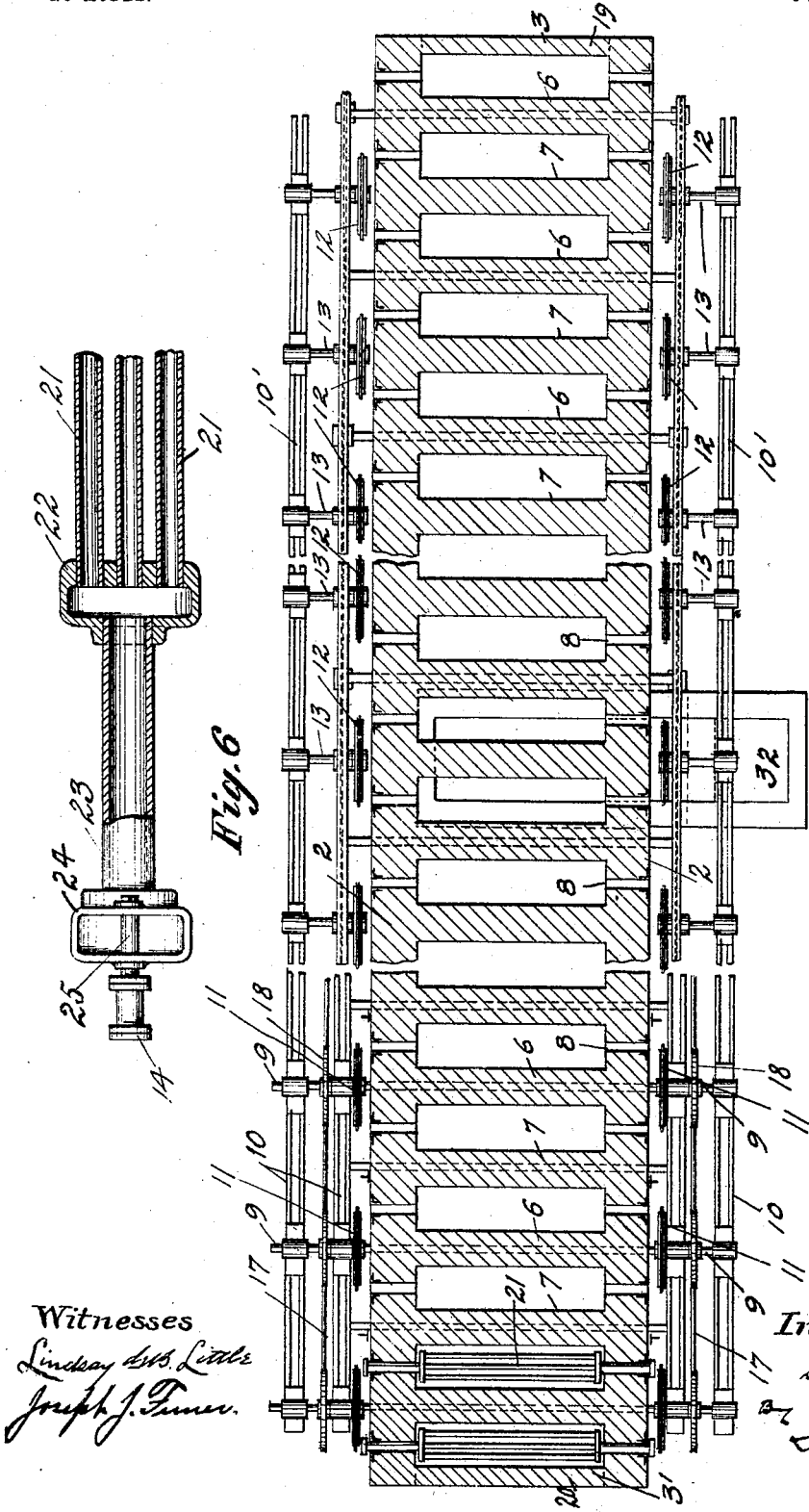

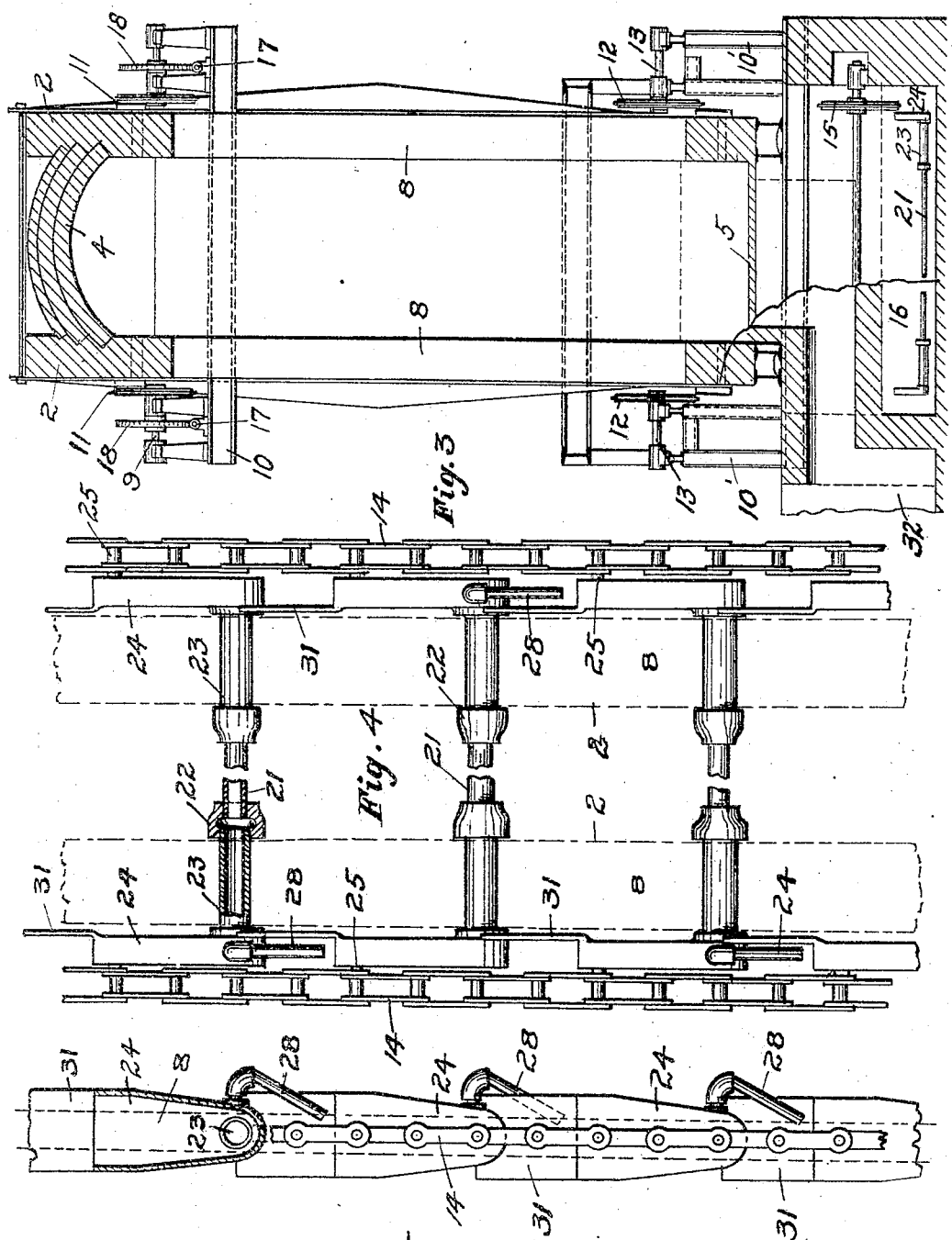

UNITED STATES PATENT OFFICE.

DAVID FORD HENRY, JR., OF PORT MURRY, NEW JERSEY.

CONTINUOUS KILN.

SPECIFICATION forming part of Letters Patent No. 764,723, dated July 12, 1904.

Application filed December 30, 1903. Serial No. 187,177. (No model.)

*To all whom it may concern:*

Be it known that I, DAVID FORD HENRY, Jr., a citizen of the United States, residing at Port Murry, in the county of Warren and State of New Jersey, have invented certain new and useful Improvements in Continuous Kilns, of which the following is a specification, reference being had therein to the accompanying drawings.

The primary object of this invention is to provide a continuous kiln for burning clay products, particularly hollow fireproofing tile, wherein the formed clay articles are entered at one end and at the opposite end are discharged fully burned and ready for use, the burning having been accomplished during the slow passage of the ware through the kiln. The green ware may or may not have been dried before entering the kiln, as determined by the character of the clay and the uses for which the ware is intended.

A further object of the invention is to provide means on the exterior of the kiln for sustaining and moving the ware-supports therethrough, also to provide means for cooling the supports.

In the accompanying drawings, Figure 1 is a view of the improved apparatus, a portion thereof being shown in side elevation and a portion in vertical section, the operating mechanism being shown on only part of the view. Fig. 2 is a sectional plan view on line 2 2 of Fig. 1. Fig. 3 is a vertical cross-sectional view on line 3 3 of Fig. 1. Figs. 4, 5, and 6 are detail views.

Referring to the drawings, the kiln structure is, preferably, of rectangular form and relatively high and narrow, 2 being the side walls thereof, 3 3' the end walls, 4 the crown, and 5 the floor or bottom. A vertically-winding course or passage-way is formed within the kiln by vertical baffle-walls 6, rising from the bottom thereof nearly to the crown, and corresponding walls 7, depending from the crown nearly to the floor. Walls 6 and 7 are parallel and in the present embodiment are arranged alternately. Side walls 2 are slotted vertically between walls 6 and 7, as shown at 8, the slots being made continuous around the open ends of said walls, as indicated at 8'.

On each side of the upper portion of the kiln is a series of shafts 9, journaled in elevated framework 10 and carrying sprockets 11, while similar sprockets 12 are carried by the corresponding base-shafts 13 in framework 10', shafts 9 being in the planes of baffle-walls 6 and shafts 13 in the planes of walls 7. Operative on the sprockets at each side of the kiln is an endless drive-chain 14, said chains being parallel and coursing around base-sprockets 15 and through base or return-passage 16. Power is imparted through the medium of worm-shafts 17, journaled in framework 10 and meshing with worm-gears 18 on shafts 9. The continuous series or succession of ware-supports are secured to the said chains and are carried thereby from end to end of the kiln and through the circuitous course defined by the baffle-walls 6 and 7 and through return-passage 16, the ware being placed thereon through inlet-door 19 in end wall 3 and removed through outlet-door 20 in wall 3', or the supports may be loaded and unloaded in any other convenient manner.

In the present embodiment each of the ware-supports consists of three parallel tubes 21, rigidly united at the ends by manifolds 22, and projecting outward centrally from the latter are tubular stems 23, which extend through and are movable in wall-slots 8 and rigidly unite with the lower portions of the open-top buckets 24, the latter comprising hangers for affording the ware-supports a swinging connection with chains 14, being loosely mounted on pins 25, projecting therefrom. For water-cooling the supports as they pass through the kiln for counteracting the destructive action of the intense heat I provide an elevated water-supply pipe 26, having outlets 27, which are immediately above and in line with the vertical courses of buckets 24, and discharge a constant stream of water into the buckets of the uppermost supports from which it flows downward through the successive supports and finally discharges at the base of the kiln. The arrangement is such that each support receives the water in bucket 24 at one end from spout 28, depending thereover from the bucket next above, and after circulating therethrough the water is discharged at the opposite end of the support from which it was received. Thus the water is caused to course in reverse directions through the successive supports, thereby certainly and effectually cooling all portions thereof. The water enters each spout 28 below the top plane of pipes 23 and 21, so that the latter are never entirely full, thus providing a free escape for any steam generated therein. As the buckets make the turn at the top of the kiln, spouts 28 discharge into short troughs 29, and from the latter the water is directed by inclined spouts 30 into the line of the ascending buckets. The successive buckets and spouts are so arranged as not to interfere with each other in making the top and bottom rounds in the circuitous course, and being entirely on the inside of the chains the operation of the latter is in no way impeded. As the combined buckets and hangers turn freely on pins 25, the parallel tubes 21, which comprise the ware-sustaining surface of the supports, are maintained in constant horizontal planes, and there is not the slightest tendency to tip and displace the ware however circuitous the course through which they pass in traversing the kiln. Buckets 24 are positioned quite close to the outer faces of walls 2, and together with plates 31, carried thereby and overlapping the buckets next below, operate to substantially close slots 8 and prevent the escape of any considerable amount of heat.

Heat may be generated and combustion sustained within the kiln by various means. In the present adaptation kiln-floor 5 is interrupted by grate 32, in which the fire is started and which in the subsequent burning serves as an air-inlet, a strong draft or blast being maintained toward each end of the kiln by suction blowers or fans, (not shown,) connecting therewith at 33, the draft being of course through the circuitous passage traversed by the ware. After the fire has been started in the grate and the kiln heated in a preliminary way I propose to use comminuted coal, which may be supplied directly into the kiln through stoking-openings 34 in crown 4, the fine fuel being almost instantly transformed into an incandescent or burning gas of high heat which completely envelops the ware. The burning may, of course, be accurately regulated and controlled by the blowers, and by this means also the fire may be made more intense at one end of the kiln than at the other.

With my improved apparatus the ware is rapidly and thoroughly burned and loss incident to breakage is practically eliminated. The kiln may continue in operation for long periods, and after the structure has become thoroughly heated the necessary heat may be continuously sustained with a comparatively small consumption of fuel, whereas with the old form of kiln for each setting of ware it is necessary to heat up the kiln from a cold condition, and after the burning the kiln must cool down, together with the ware, before the latter can be removed.

While I have shown and described the apparatus in its preferred embodiment, the invention may be changed and modified in various ways without departing from the spirit thereof as defined by the appended claims.

I claim—

1. The combination of a kiln, ware-supports, and support-carrying means operative on the exterior of the kiln for moving the supports therein.

2. The combination of a kiln having slotted walls, ware-supports movable in the kiln, and actuating means on the exterior of the kiln and operatively connected to the supports through the kiln-slots.

3. The combination of a kiln having its walls slotted to define a circuitous course, ware-supports movable within the kiln, and actuating means on the exterior of the kiln and operatively connected to the supports through said slots.

4. The combination of a kiln, upright baffle-walls therein each of which is open transversely either at its upper or lower end, ware-supports movable in a circuitous course around said walls, and support-carrying means on the exterior of the kiln.

5. The combination of a kiln, upright baffle-walls therein open alternately at their upper and lower ends, the outer walls of the kiln having continuous slots between the baffle-walls and around the open ends thereof, ware-supports, and carrying means on the kiln exterior and operatively connected to the supports through said slots.

6. The combination of a kiln, and water-cooled ware-supports movable therein.

7. The combination of a kiln, hollow-ware supports movable therein, and means for circulating water in the supports while moving in the kiln.

8. The combination of a kiln, hollow-ware supports movable therein, and means at the exterior of the kiln constructed and arranged to supply water to the supports as they move in the kiln.

9. The combination of a kiln, hollow-ware supports movable therein one above the other, a water-supply for the uppermost supports, and means whereby each support is caused to discharge into the support next below.

10. The combination of a kiln, hollow-ware supports movable therein one above the other, a water-supply for the uppermost supports, each support being constructed and arranged to receive water at one end from a support above and to discharge the same at its opposite end to a support below.

11. The combination of a kiln having vertically-slotted side walls, hollow-ware supports movable through the kiln in vertical succession, the supports having tubular extensions projecting through the wall-slots, and means whereby said tubular extensions are adapted to receive and discharge water.

12. The combination of a kiln, hollow-ware supports therein arranged one above the other, conveyer-chains to which the supports are pivotally secured, a water-receiving chamber for each support, and a water-discharge for each support constructed and arranged to discharge into the water-receiving chamber of a support below.

13. The combination of a kiln having slotted walls, ware-supports movable in the kiln one above the other, each support consisting of tubular members united at their ends by manifolds, a tubular extension on each manifold projecting through the kiln-slots, a combined water-chamber and hanger at the outer end of each of said extensions, water supply and discharge means for each of said chambers, and carrying means to which the combined chambers and hangers are pivotally secured.

14. The combination of a kiln having slotted walls, ware-supports within the kiln, support-conveying means outside the kiln and operatively connected to the supports through the kiln-slots, and slot-closing devices movable with the supports.

15. The combination of a kiln having a vertically-circuitous course or passage-way, means for maintaining a burning heat therein and for causing the same to flow therethrough, and vertically-movable ware-carrying mechanism adapted to traverse the vertically-circuitous course without closing the same or interrupting the flow of the burning heat.

16. The combination of a kiln having an open vertically-circuitous course or passage-way, means for maintaining a burning heat therein, and vertically-movable ware-carrying mechanism constructed and arranged to move throughout said vertically-circuitous passage without closing the same.

17. The combination of a kiln having an open circuitous course or passage-way, means for maintaining a burning heat therein, means at opposite ends of the passage-way for creating an outwardly-flowing blast or suction, and ware-carrying mechanism movable through said circuitous passage-way without closing the same.

18. The combination of a kiln, hollow-ware-carrying supports movable therein, and means for applying a cooling agent to the interior of the supports while moving in the kiln.

19. The combination of a kiln having a vertically-circuitous passage-way, draft inducing and regulating means for the passage-way, fuel-feeding openings in the upper portion of the kiln for maintaining combustion in the passage-way, and ware-carrying mechanism movable through the circuitous passage-way.

20. The combination of a kiln, a succession of upright transverse walls therein, some of said walls being open at their upper ends and others at their lower ends thereby forming a circuitous course or passage-way through the kiln, ware-supports and means for moving them through said circuitous way, and means for maintaining combustion within the kiln and around the ware-supports as they pass therethrough.

In testimony whereof I affix my signature in presence of two witnesses.

DAVID FORD HENRY, Jr.

Witnesses:
 MARGARET HUGHES,
 J. M. NESBIT.